United States Patent [19]

Pasqualini et al.

[11] Patent Number: 5,579,594
[45] Date of Patent: Dec. 3, 1996

[54] DEVICE AND PROCESS FOR BONDING WEARING PARTS ON AN EXCAVATOR

[75] Inventors: Charles Pasqualini, Feurs; Jean M. Pasqualini, Mornant; Sylvain Pasqualini, Lumbres, all of France

[73] Assignee: AFE Metal SA, France

[21] Appl. No.: 219,451

[22] Filed: Mar. 29, 1994

[30] Foreign Application Priority Data

Mar. 29, 1993 [FR] France ................................... 93 04013

[51] Int. Cl.$^6$ .................................................. E02F 9/28
[52] U.S. Cl. .................. 37/455; 37/446; 37/456; 156/305; 172/772
[58] Field of Search ............................. 37/446, 449, 450, 37/451, 452, 453, 454, 455, 456, 457, 458, 459; 156/91, 155, 247, 293, 305, 344; 172/701.3, 713, 719, 772, 772.5; 264/263, 274; 403/265, 267, 269, 294; 433/218, 221

[56] References Cited

U.S. PATENT DOCUMENTS

| | | | |
|---|---|---|---|
| 1,563,404 | 12/1925 | Schulte | 37/456 X |
| 1,743,890 | 1/1930 | Harrington | 37/455 |
| 2,064,059 | 12/1936 | Fellmeth | 37/456 |
| 2,339,128 | 1/1944 | Younie | 37/456 |
| 3,256,622 | 6/1966 | Hostetter | 37/458 |
| 3,330,055 | 7/1967 | Petersen | 37/457 |
| 3,406,471 | 10/1968 | Duplessis | 37/457 |
| 3,707,788 | 1/1973 | Sturgeon | 37/457 |
| 4,335,532 | 6/1982 | Hahn et al. | 37/459 |
| 4,470,210 | 9/1984 | Hahn | 37/328 |
| 4,516,340 | 5/1985 | Launder | 172/713 X |
| 4,748,754 | 6/1988 | Schwappach | 172/713 X |
| 4,846,685 | 7/1989 | Martin | 433/221 |
| 4,891,893 | 1/1990 | Bowes, Jr. | 37/328 |
| 4,941,711 | 7/1990 | Stiffler | 172/713 X |
| 4,965,945 | 10/1990 | Emrich | 37/456 |
| 5,068,986 | 12/1991 | Jones | 37/457 |
| 5,088,214 | 2/1992 | Jones | 172/772.5 X |
| 5,172,500 | 12/1992 | Renski et al. | 37/457 |
| 5,177,886 | 1/1993 | Klett | 37/456 X |
| 5,272,824 | 12/1993 | Cornelius | 37/455 X |

FOREIGN PATENT DOCUMENTS

| | | | |
|---|---|---|---|
| 2072357 | 9/1971 | France . | |
| 2204741 | 5/1974 | France . | |
| 3538156 | 7/1986 | Germany . | |
| 2025557 | 1/1980 | United Kingdom . | |
| 2147562 | 5/1985 | United Kingdom | 37/456 |

OTHER PUBLICATIONS

Database WPI, Week 7534, Derwent Publications Ltd., London, GB; AN 75-75535W 7 SU-A-449 133 (Ukrniiproekt Coal) (Nov. 15, 1974).

*Primary Examiner*—Blair Johnson
*Assistant Examiner*—Andrea Chop
*Attorney, Agent, or Firm*—Harris Beach & Wilcox LLP

[57] ABSTRACT

The device is distinctive in that tooth (D) and matching adapter (A) are both designed with matching shapes to allow, after assembly, the formation and definition of one or more spaces (V) of variable shape, as appropriate, the adapter and tooth being made with one or more openings allowing the filling and application of a special-purpose material (M) in the above-mentioned space(s), said special-purpose material fulfilling the functions of locking the tooth relative to the adapter by absolute contact between the tooth and adapter by forming a contact cushion that ensures distribution of the stresses and strains in all the areas filled by the material.

18 Claims, 15 Drawing Sheets

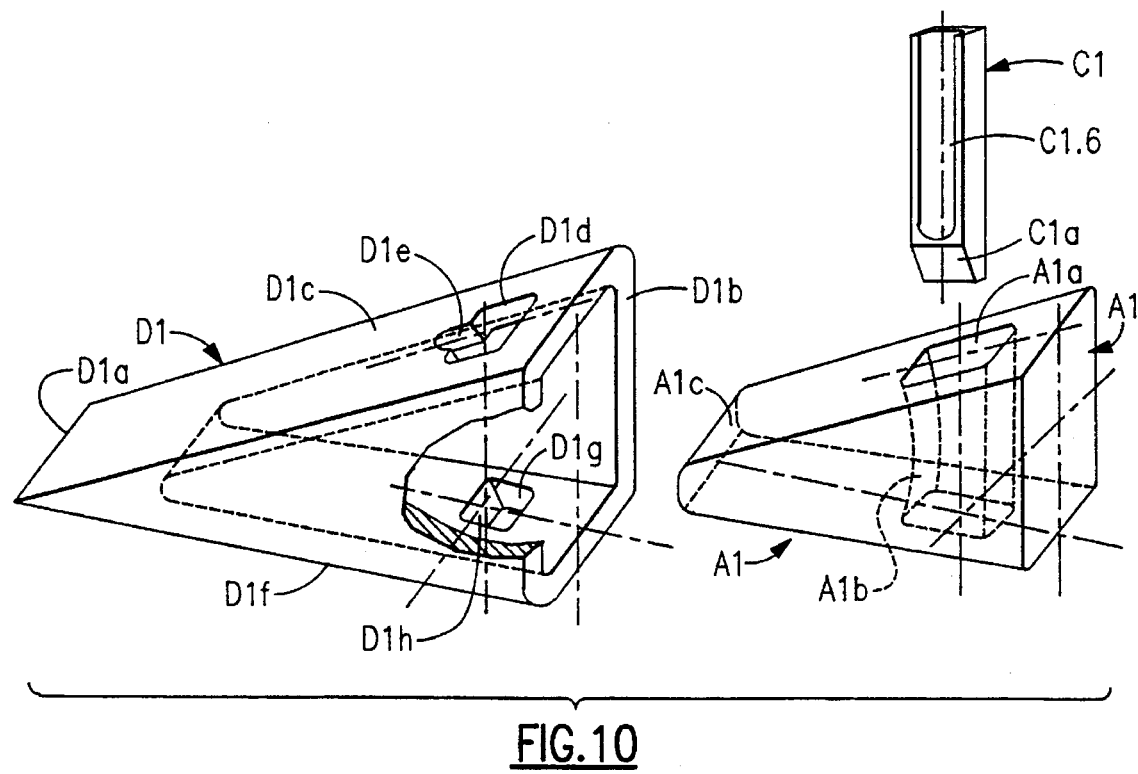
FIG. 10
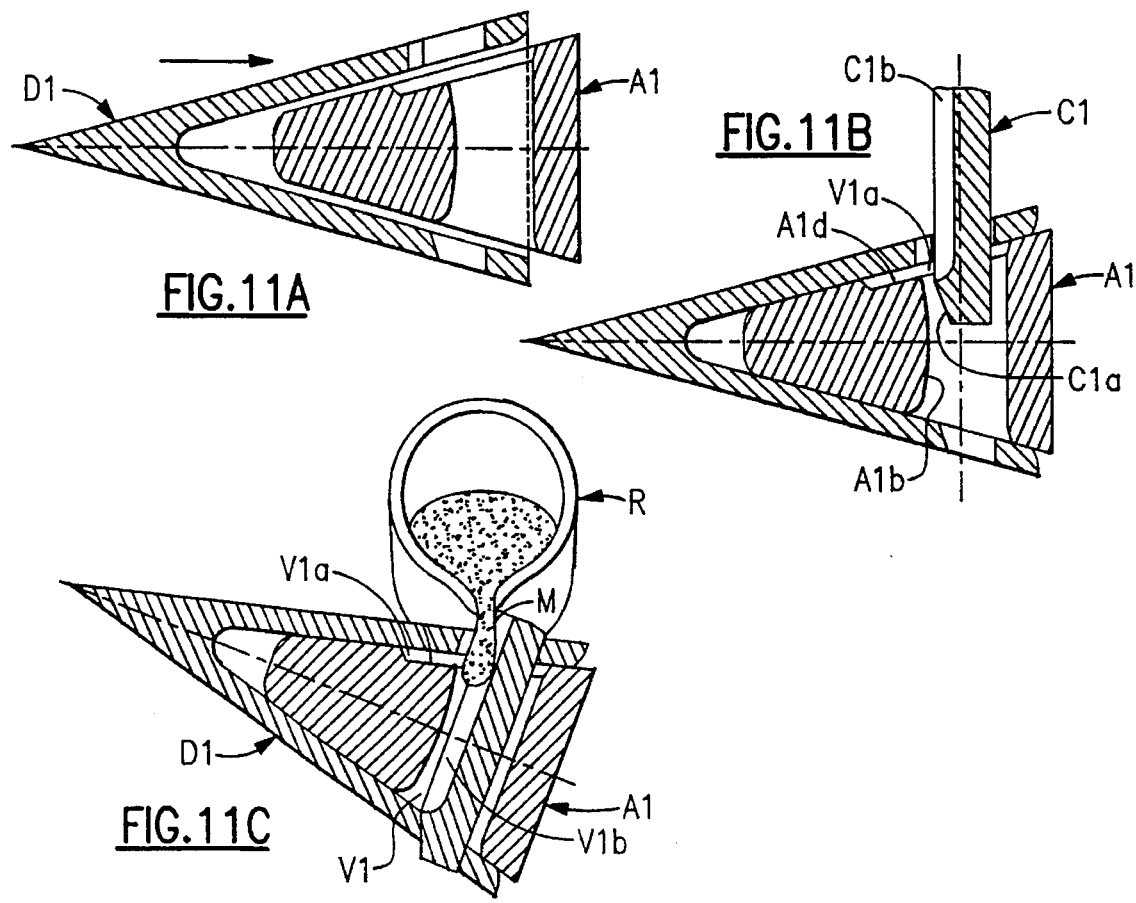
FIG. 11A
FIG. 11B
FIG. 11C

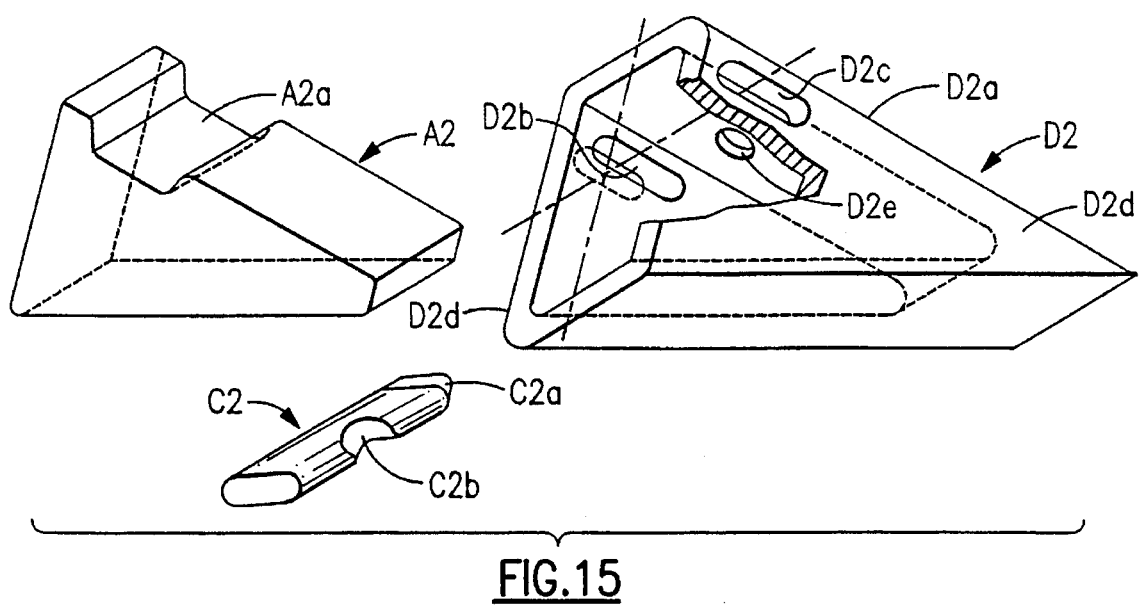
FIG.15
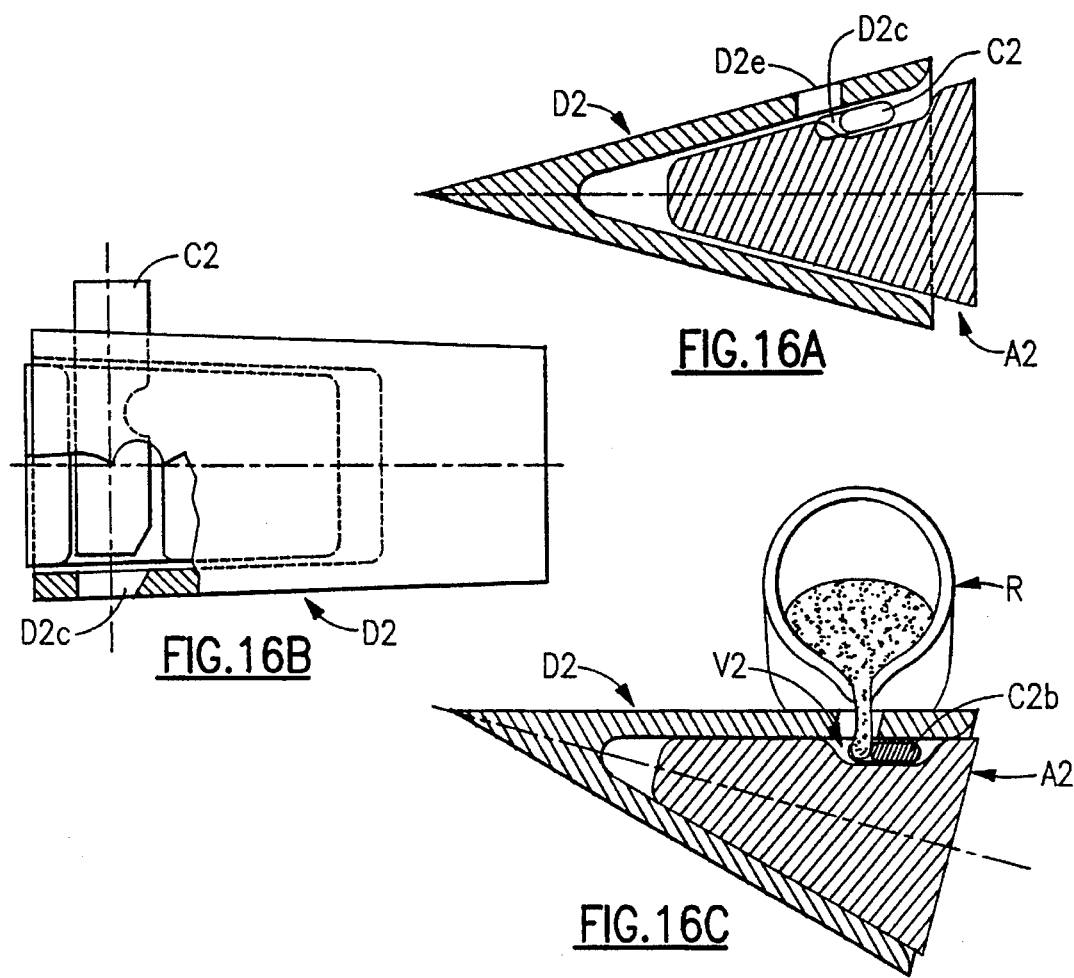
FIG.16A
FIG.16B
FIG.16C 5,579,594

DEVICE AND PROCESS FOR BONDING WEARING PARTS ON AN EXCAVATOR

BACKGROUND OF THE INVENTION

The invention relates to the technical fields of equipment for an excavator having buckets, cups or other receptacles capable of scraping or grabbing materials or the like with a view to their removal from a given place to other operating sites by means of an excavator.

It is well know, according to prior art, how to fit, on buckets or similar receptacles of an excavation engineering plant, shaped adapter tips which can be fitted with removable teeth having a matching profile. These teeth are in direct contact with the materials to be grabbed or scraped and are consequently subject to rapid wear due to stresses during use. The shaped adapter tips on buckets or receptacles are male parts joined to the lip of the preshaped bucket or receptacle and are produced as a separately mounted or one-piece part during formation of the bucket or receptacle.

Teeth that are separately mounted are female parts which have shapes which match the profiles of the adapter tip or tips and fit over them.

The need to change teeth as they wear requires a join between said wearing parts or teeth and the corresponding adapter tip. This joint is, according to the prior technique, made available by very many manufacturers in the form of a wedge-shaped key that can be of metal or hybrid construction and provide flexibility through a flexible material.

All the available systems according to the prior art have one feature in common: they exhibit and ensure a balance in the strength of the separately mounted tooth and the corresponding adapter tip. In fact, given the stresses during use, there must be a solid, constant connection between the tooth and the adapter tip which withstands the thrust and backward stresses encountered during the forces exerted. As shown diagrammatically in FIG. 1, the joint between the two parts is such that there must be a forward support area and rear backrest areas in the joint obtained between the tooth and the adapter tip.

Thus, according to the prior art, in a first embodiment, a monolithic key is used which fits into openings made on the adapter tip and on the corresponding tooth. This layout is shown in FIGS. 2 and 3. This layout is, however, difficult to achieve because it requires absolutely geometrically accurate positioning of the tooth with respect to the adapter, failing which the key, if its working faces are parallel, may not be able to enter into its recess or may not provide the desired tightening. In order to overcome this drawback, there have been suggestions to make the end of the base of the key with a bevel that provides a wedge affect. Nevertheless, its position when it is driven home remains random and sometimes the key may partially protrude on one side or the other, thus obstructing assembly. In addition, in this embodiment, holding of the key is not ensured and is not long-lasting and any unintentional shock at the thinner end of the key may cause it to protrude or come loose from its recess, thus making joining of the tooth to the adapter tip in question ineffective.

In order to overcome this drawback, a thinner end of the key has been suggested, as shown in FIG. 3, which can be folded over in order to prevent it from coming loose and, in another embodiment as shown in FIG. 4, the use of a cylindrical key with a retaining collar of the circlip type which makes it necessary to form a recess in the adapter tip or the use of a metal or rubber end retaining cap shown in FIG. 5 have been suggested. A multi-key system shown in FIG. 6 is also known which allows locking by a wedge effect due to opposite sloping surfaces.

In all these implementations, in order for the keying to remain effective in service if it is mechanical and direct with a monolithic key, the latter must be force fitted thus causing misshaping of the areas that receive the tooth with possible deformation of the key.

According to other solutions according to the prior art, mechanical keying by an elastic key has been suggested. This joining system makes it possible to simultaneously secure the tooth and retain the key. In this application the latitude given by the various devices is relatively small and does not make it possible to disregard the need for absolute geometrical accuracy in the positions of the tooth and of the adapter tip. In order to illustrate this layout, FIGS. 7 and 8 show metal keys which are elastic and have a curved shape which tends to deform when the key is fitted in the desired joint. These keys can be of the split pin type or be of solid cross-section. Alternatively, the central part of the keys can be fitted with a spring ring.

According to other possibilities of the prior art, keying comprising a rubber element that is either integrated in a sandwich structure (FIG. 9a) or independent (FIG. 9b) in combination with a key has been suggested. In this latter implementation, the rubber block comprises inserts and is made with alternating valleys and peaks spaced apart and positioned opposite and along the key in question so that they fit into matching valleys and peak shapes arranged on the key. Joining is obtained by assembling the two parts after previously inserting the rubber block and then forcing in the key. In this implementation the rubber block previously placed in its recess in the adapter must be accurately positioned with respect to the tooth and the key; it must be possible to insert the key by moving apart the peaks on the rubber block which must then spring back into the matching hollows in the key when the latter is in position. If tightening is excessive, the key cannot enter and may damage the rubber block by tearing it. If tightening is insufficient, the key goes in easily but there is no assurance that it will be secured in service.

All the known layouts according to the prior art show that there are a certain number of significant drawbacks such as difficulties in fitting and removing by force, poor gripping in service and loss of keys and teeth, movement of teeth on adapters which causes wear of the tip which worsens gradually as teeth are changed and, through the play thus created, contributes to their breakage.

In addition, connections with worn adapters are unreliable because the connecting elements, keys and rubber blocks of predetermined shapes and dimensions in order to conform with first fitting, no longer match them. Keys having special compensated shapes sometimes have to be used and this makes conditions of use considerably more complicated.

In every case absolute geometrical accuracy is required for the position of the tooth with respect to the adapter so that alignments of points of action and reaction defined by supports and backrests between tooth and adapter are within the possible geometrical limits of the keying system adopted.

The geometrical positioning accuracy required at the time of first fitting as well as in the event of subsequent adaptation of teeth on adapters demonstrates that interchangeability is difficult to obtain and monitor and, in every case, is very expensive. The shapes obtained in some cases are complex and involve costly manufacturing processes. In addition, fitting is not easy to achieve when it is necessary to change teeth on adapters on site if the tightening of keys is excessive.

According to the prior art, the possibility of placing packing strips made of compressible materials between the tooth and adapter which are therefore no longer in direct contact is also known. This applies, in particular, to U.S. Pat. No. 3,538,156. These strips of compressible material cannot withstand the mechanical stresses transmitted to the tooth, their staying in position is problematic during service when the teeth move and they are gradually damaged.

U.S. Pat. No. 3,707,788 makes provision for placing a deformable predefined elastomer at the bottom of the tooth on which the end of the adapter rests; said material fulfils a backrest function but does not provide a joint between the tooth and the adapter.

The use of a fluid material capable of creating, after cooling, a final imprint to allow fixing of the support shank of the adapter tip on which a tooth is separately mounted and secured by means of fixing is also known from U.S. Pat. No. 4,470,210 ESCO. The only function of this predefined imprint is to allow easy changing of the tooth-adapter assembly and to allow repositioning under defined angular relationship and orientation conditions of a new assembly on the basis of the imprint.

All the documents within the scope of the prior art suggest no simple and quick way of assembling and disassembling a tooth on an adapter which ensures strength of the assembly under all circumstances given stresses during use.

SUMMARY OF THE INVENTION

The object sought after according to the invention was therefore to overcome these drawbacks by suggesting a new type of simple, effective and quick bond between teeth and adapters which avoids all the previous relative constraints, on the one hand, in terms of dimensional accuracy of connecting areas and devices and ensures that they stay in position during work and, on the other hand, prevents their deterioration.

Another object sought after according to the invention was to suggest a new type of bond that can be made by operators without any particular difficulty and, in particular, directly on site where an excavator is used.

Another purpose sought after according to the invention was to suggest a new type of bond between the tooth or teeth and the adapter or adapters, buckets, bucket lips, reinforcing pieces, shields and other wearing parts which is perfectly reliable in position when the plant is in service and used without any risk of it accidentally becoming loose due to external impact.

These objects and others will become apparent from the following description.

According to a first aspect of the invention, the device for bonding wearing parts and those that accommodate them such as, removable teeth and adapters on the ends of tools and receptacles used on an excavator, said tooth or similar having a hollow internal shape, said adapter or similar having a tip shape allowing it to fit into said tooth, a material acting as packing being placed in one or more areas between the tooth and adapter in order to provide one or more contact cushions to ensure distribution of stresses and strains, is distinctive in that the tooth and adapter and the like are made on at least one of their contact surfaces and/or in their thickness with one or more matching shapes to constitute filling areas and spaces for filling, containing and removing a filler material applied after prior assembly of the tooth on the adapter in order to provide, at least in these areas, absolute contact between the tooth and adapter thus allowing the latter to withstand the stresses and strains over larger surface areas, the material being of fluid form and capable of deformation and in that the matching shape(s) is/are located near and in connection with the opening(s) for filling the fluid material and in that the filled material, as it solidifies, performs the functions of bonding and securing the tooth and the adapter or the like and in that the configuration of the recess areas intended for filling and containing the material have the function of fixing one or more masses of elastic material of a volume sufficient to be capable of compression and expansion during transmission to the adapter of multidirectional mechanical stresses exerted on the tooth or the like during its operation.

According to a second aspect of the invention, the device is distinctive in that it comprises a key connected to the tooth and possibly also to the adapter, said filler material acting as a tightening key and securing it during service.

According to a third aspect of the invention, the process of bonding the teeth and adapters and the like is distinctive:

in that the tooth is placed on its adapter in contact with the latter, i.e. in its final position, without any attempt to achieve any accuracy in terms of the fitting level, in that, if a key is used, the key is inserted between the tooth and the adapter, the key becoming bonded to the tooth without it touching the adapter and with respect to which no accuracy is required.

in that the filler material is filled in fluid form in the recess or recesses defined by the inlet opening(s) between the adapter, the key and the tooth or between the tooth and adapter and the like, said material being capable of deformation so that it can fill the space(s) forming recesses provided for it regardless of these spaces and their shapes and then, when solid, is ready to fulfil the functions of bonding and securing the tooth and adapter and absorbing and damping the multidirectional mechanical stresses generated during operation of the tooth.

BRIEF DESCRIPTION OF THE DRAWING

These aspects and others will become apparent from the following description.

The object of the present invention is described, merely by way of example, in the accompanying drawings in which:

FIGS. 1 to 9A, 9B show various known connecting systems of prior art,

FIG. 10 is an exploded view before assembly of the bonding device according to the invention in a first alternative embodiment, FIGS. 11A, 11B, 11C show the fitting of the various means according to the invention in FIG. 10, FIG. 15 is an exploded view before assembly of the bonding device according to the invention in a second alternative embodiment, FIGS. 16A, 16B, 16C show the fitting of the various means according to the invention in FIG. 15.

DESCRIPTION OF THE INVENTION

Figure 1:
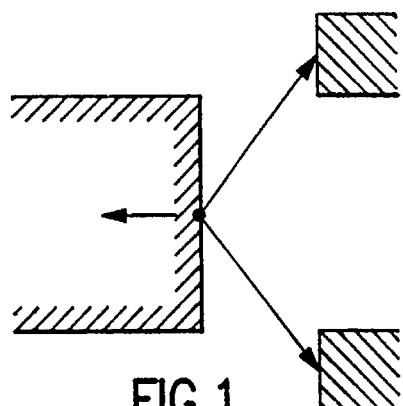
Figure 2:
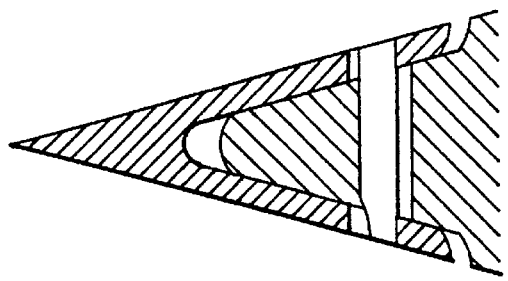
Figure 4:
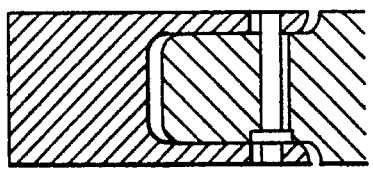
Figure 3:
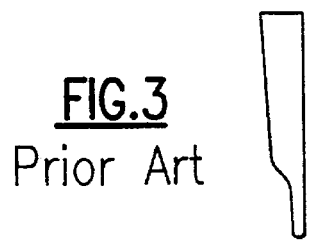
Figure 7:
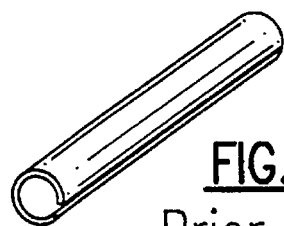
Figure 5:
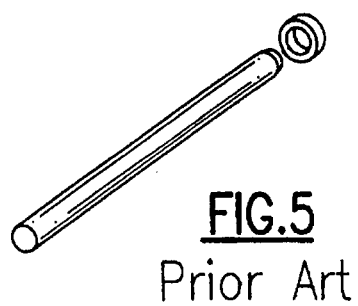
Figure 8:
Figure 9A:
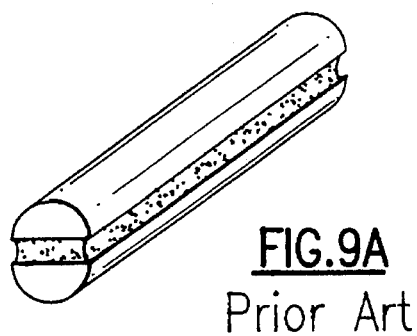
Figure 9B:
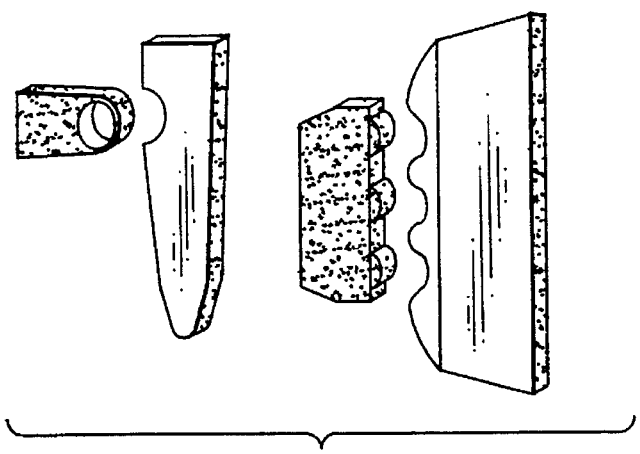
Figure 6:
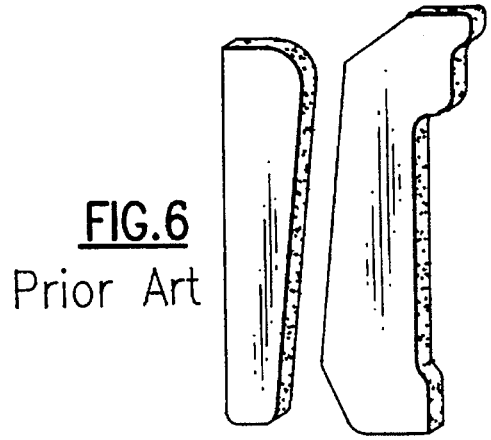

In order that the present invention may more readily be understood, the following description is given, merely byway of example, reference being made to the accompanying drawings.

The invention is applicable to the mounting of wearing parts such as teeth and adapters, buckets, wedges, bucket lips, reinforcing pieces, shields and any other similar wearing parts that are suitable and used for an excavator and various equipment employed in the treatment of materials and their handling.

The rest of the description will essentially refer to the application of the invention to teeth and adapters merely by way of example.

The bonding device which is the subject of the invention is original in that in every case it eliminates all constraints in terms of the need for geometric positional and dimensional accuracy between the tooth (D) and the associated adapter (A) and does so by adding a special-purpose material (M) which, on its own or in combination with a key (C), provides the bond between the tooth and the adapter in question.

According to the invention, the device for making a bond between removable teeth and adapters is distinctive in that the tooth and the adapter and similar wearing parts are made with one or more matching shapes on at least one of their contact surfaces and/or in their thickness to provide areas and spaces for filling, containing, retaining and removing a filler material poured in after prior assembly of the tooth on the adapter, the material being in fluid form and capable of deformation. The matching shape or shapes are located close to and in connection with the opening(s) for filling the fluid material. The filled material, as it solidifies, fulfils the functions of bonding and securing the tooth and the adapter. The configuration of the recess areas intended for filling and containing the material has the function of fixing one or more masses of elastic material of a volume sufficient to be capable of compression and expansion during transmission to the adapter of the multidirectional mechanical stresses exerted on the tooth during its operation.

This special-purpose material has the property of deformation in order to be able to completely fill, by pressure or by gravity, one or more predefined spaces (V) constituting recesses of variable shape between the tooth and the adapter and of providing in situ, by then changing to the solid state, one or more masses that seal and can behave as a block regardless of the position of the tooth in relation to the adapter with which it was simply placed into contact.

This special-purpose material (M) may be, merely by way of example:

A product that is liquid at room temperature and which solidifies by polymerisation such as a resin with one or two components, an elastomer silicone, a heatsetting resin, A product in powder or granule form which, after it has been applied, hardens solidly through the action of an external agent or an internal reagent, A paste product applied by pressure and then hardened by polymerisation or curing such as a foam resin or silicone elastomer, A solid product such as a bladder capable of expansion by filling a liquid or gaseous fluid into an envelope made of plastic or rubber.

This special-purpose material offers particularly important benefits, especially in that it allows, by absolute contact between the tooth and the adapter in predetermined areas and recesses, rational diffusion of mechanical operating stresses exerted on the tooth and adapter to ensure better distribution of joining forces thus contributing towards greater strength of the bond obtained by limiting, in particular, the risks of fracture.

As will be stated below, this material can secure the tooth on the adapter on its own without using a key. It may also act as a tightening key if a key is used whilst also ensuring its strength in service.

Thus, according to the solution and originality of the invention, the bond is made as follows:

The tooth is placed on its adapter in contact with the latter, i.e. in its final position, without any attempt to obtain any particular fitting level, If a key is used, the key is inserted between the tooth and the adapter which, due to a wedge effect, is joined to the tooth, the key becoming joined to the tooth without touching the adapter with respect to which there is no accuracy requirement. There is significant clearance between them. The key also need not necessarily be simultaneously in contact with the tooth and the adapter, Then, between the adapter and the key or between the tooth and the adapter, one pours the special-purpose material of the above-mentioned type capable of deformation so that it can fill the space(s) forming recesses provided for it regardless of these spaces and remain in them in the solid state ready to fulfil the desired locking functions.

The invention should be examined at three levels of equivalent importance, the fitting of the components, behaviour in service and the operation of replacing worn parts.

FITTING OF COMPONENTS

One fundamental difference in the invention compared with the prior art is the fact that the special-purpose locking material is no longer constrained by a geometric shape that is restrictive from the start and can, without reservation, compensate the locking space as necessary in each case. There is no longer any attempt to obtain absolutely geometrically accurate positioning of the tooth on the adapter, the position of the tooth is simply controlled when it is in contact with the adapter regardless of the position. This eliminates final adjustment and geometrical inspection operations which are significantly expensive.

If a key is used, each of the three components (tooth, adapter, key) may have a special feature intended to allow passage of the filler material which will fill the permitted space in order to form the required elastic component. In contrast to the prior art, the components are fitted quickly without exerting any force; the special-purpose fluid material solidifies very quickly and does not impose any penalty on the time for which machinery is available for use.

BEHAVIOUR IN SERVICE

The filler material such as a resin, after polymerisation, can itself behave as a retention element, its mass being gripped in a recess in the adapter. If a key is used, the filler material fulfils two other functions by behaving as a tightening key and securing the key in position. These arrangements prevent any unwanted premature ejection of the key under the effect of pressure during service. The configuration of the recesses intended for the fluid filler material in the adapter has two special features. The first is that it tends, at the interface with the key, to form a mass of material creating an elastic element of sufficient volume to be capable of compression and expansion during transmission to the adapter of the multidirectional mechanical stresses exerted on the tooth during its operation.

The second special feature is that, independently of the clearance between tooth and adapter which may exist in the area near where the material is filled, one can create, by deliberate removal of material from the adapter, areas that the material can easily fill. This creates absolute contact in such areas between the tooth and the adapter and provides a brake on relative movement of these two components during their operation, thus significantly reducing the risk of the tip of the adapter becoming worn.

OPERATION OF REPLACING WORN PARTS

This operation is inherently frequent and must therefore be carried out easily, quickly and in complete safety. The configuration of all the components: adapter, tooth, key is arranged in a specific manner in order to satisfy these conditions.

Complete dismountability is ensured, provision is made for access to the components concerned and for the operations needed to remove worn parts. When a key is not used and the actual material retains the tooth, the recess areas in the material are close to the filler opening. The material can therefore be removed through this opening either by the action of a flame or by the action of a hollow punch tool or other tools.

If a key is used the latter can be accessed and the filler material can be removed by heating or by mechanical action on the key to cause shattering and cutting of the material.

one of the aspects and advantages of the invention is that if the previous working conditions resulted in movement of the parts in relation to each other, the relief of the adapter may be worn. Each time a tooth is changed, in all the areas where it has access, the special-purpose material automatically takes up any play that may have been created during the previous operation. This aspect is particularly important because it affords reliability and the essential strength of the device. Thanks to the choice that is available for the special-purpose material and its flexibility and hardness, the tooth and adapter are ideally bonded by absolute contact. This makes it possible to reduce the strength requirement placed on the case of the tooth so that its mass can therefore be reduced. The utilization ratio of the tooth is thereby improved with less metal being lost for the same wear.

The device according to the invention and the procedure for implementing it are applicable to all shapes of tips and adapters and all wearing parts for an excavator and all spaces which form defined recesses between the tooth and adapter to contain the special-purpose materials. Reference should now be made to the different possible variations, merely by way of example, of implementing the device and the process according to the invention, reference being made to FIGS. 10 to 41.

Figure 12:
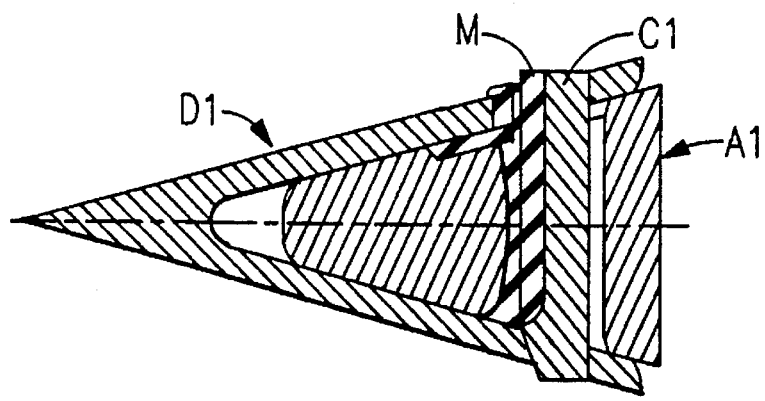
FIG. 12 is a view showing assembly of the means in the invention according to FIGS. 10 and 11A, 11B, 11C.
Figure 13:
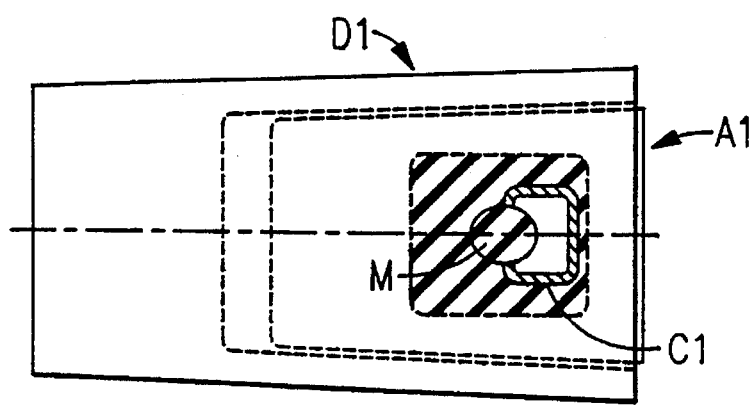
FIG. 13 is a top view according to FIG. 12.
Figure 14:
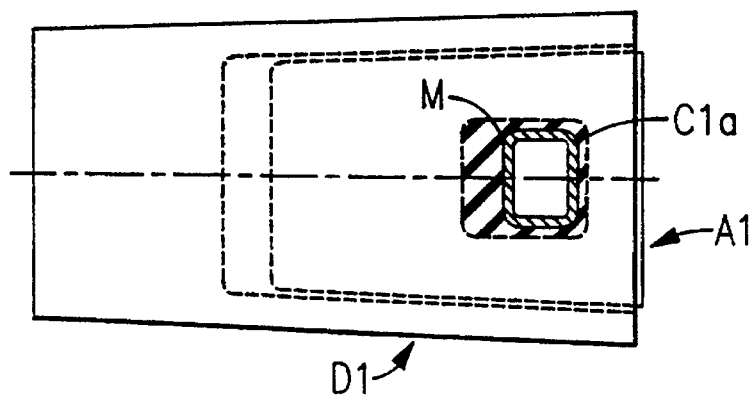
FIG. 14 is a bottom view according to FIG. 12.

In the first embodiment shown in FIGS. 10 to 14, the tooth is referred to in its entirety as D1 and comprises a V-shape, which in itself is already known, is internally hollow and has a profiled leading end (D1.*a*) for scraping and a base (D1.*b*) allowing it to fit around the adapter. The upper surface (D1.*c*) has an opening (D1.*d*) of square or rectangular cross-section for example that extends forward into a cutout (D1.*e*) forming a chamber in which the material (M) is filled. The lower surface (D1.*f*) has an opening (D1.*g*) of smaller size and has, in particular, a sloping bevel (D1.*h*) capable of cooperating with the matching tapered end surface (C1.*a*) of key (C1). Adapter (A.1) has a tip shape that can fit in the tooth. Said adapter has a vertical opening (A1.*a*) allowing it to fit key (C1), this opening is larger than the cross section of the key, thus allowing quick assembly with clearance of the latter in order to bond the tooth on the adapter. Said opening (A1.*a*) crosses either side of the adapter and advantageously has, at the same end as the tip of the latter, a concave curved shape (A1.*b*). Key (C1) has, above its tapered end (C1.*a*), hollow (C1.*b*) that opens out into the top of the key. In addition, upper surface (A1.*c*) of the tip has a hollow (A1.*d*) around opening (A1.*a*) in order to form, in relation to the tooth, an internal space (V1.*a*). Now referring to mounting of the assembly, according to FIGS. 11*a*, 11*b*, 11*c*, of the tooth on the adapter and to the positioning of the corresponding key, 10 there is a space or chamber (V1) capable of receiving a filler material of the type defined earlier. This space (V1) is defined on the one hand by space (V1.*a*) formed in the upper part of the tip and, on the other hand, by space (V1.*b*) formed in the internal chamber of the adapter opposite hollow (C1.*b*) on the key. The design of the tapered end of the key allows it to be positioned in the lower opening in the tooth into its recess by gravity. The slope forces the key to rest against the rear surfaces of the openings of the tooth, i.e. in its useful operating position. It is then completely joined to the tooth. Space (V1) is then filled by pouring filler material (M) which, in this implementation, is in a paste or liquid state and is stored in any container (R). Referring now to FIG. 12, said material completely fills the above-mentioned space(s) and, after solidifying, ensures total sealing of the tooth on the adapter with uniform distribution of bonding and therefore locking areas by firmly securing the intermediate key. In order to disassemble the tooth it is preferable to place the tooth-adapter axis vertically in order to allow access to the lower surface of the key. The latter can be extracted by mechanical action using a hammer to remove the special-purpose material which can also be evacuated by the effect of heat using a flame that can be pointed towards the filler space to heat it so that said material changes back to a fluid state. This operation may be performed without previously removing the key. One can previously heat the material without touching the key which can then be recovered for other joints.

Figure 17:
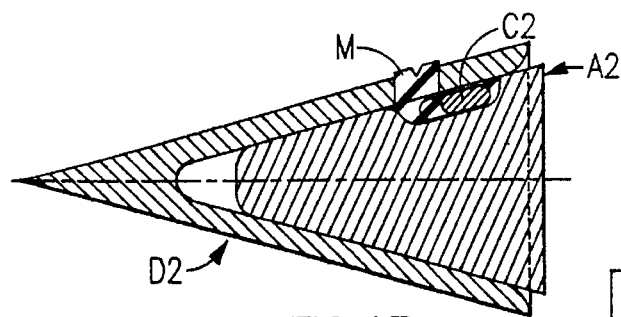
FIG. 17 is a view showing assembly of the means in the invention according to FIGS. 16A, 16B, 16C.
Figure 18:
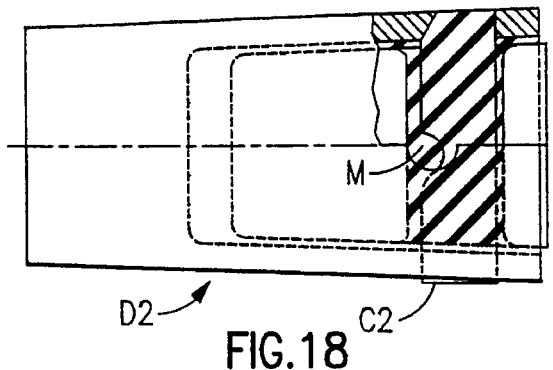
FIG. 18 is a partial sectional top view according to FIG. 17.

Let us now refer to FIGS. 15 to 18 which show another alternative embodiment of the assembly bond. In this case an intermediate key (C2) is always used which makes it possible to bond tooth (D2) to adapter (A2). In this implementation, the key is positioned horizontally. For this purpose, tooth (D2) has, on its lateral surfaces (D2.*a*), oblong openings (D2.*b*–D2.*c*) into which key (C2) can fit. Opening (D2.*b*) is of similar shape and cross-section to the key in order to allow its entry whereas opening (D2.*c*) has a conical shape with a slope to ensure bonding contact with the tooth on the rear surfaces of the oblong openings of the tooth. For this purpose, the key has a matchingly shaped rear end (C2.*a*) to ensure perfect positioning in its recess. Top surface (D2.*d*) of the tooth has an opening (D2.*e*) to allow, from the outside, pouring of the special-purpose material. The middle part of the key has a semi-circular hollow (C2.*b*) intended to be placed at right angles to the filler opening formed on the tooth, this hollow then contributing to bonding of the assembly. Adapter (A2) has a large crosswise groove (A2.*a*) on its upper part to allow passage and sliding of the key. This groove is designed to be wider and higher than the dimensions of the key in order to define a filling space or chamber (V2) for the material. As shown in FIGS. 17 and 18, the filler material fills the entire space (V2) thus defined. The tooth can be removed in a similar manner to the above operation. A very important sealing area is obtained after the material has solidified between the tooth, adapter and key with perfect distribution of the locking and bonding forces.

Figure 19:
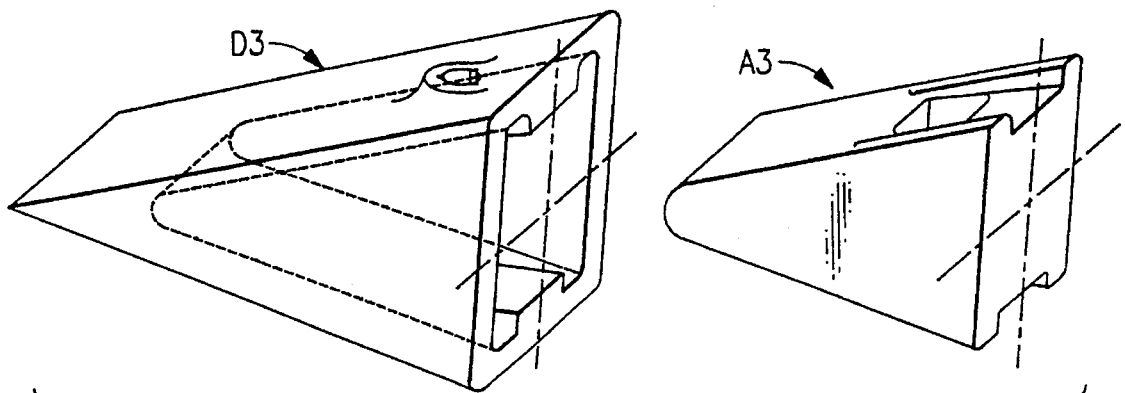
FIG. 19 is an exploded view before assembly of the bonding device according to the invention in a third alternative embodiment.
Figure 19A:
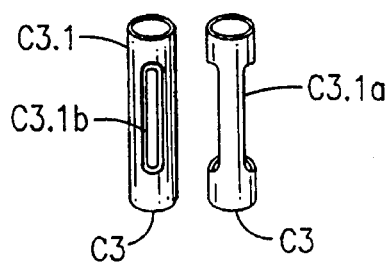
FIGS. 19A, 19B are views showing possible shapes of inserts in the implementation in FIG. 19
Figure 19B:
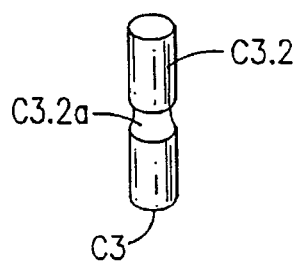

Let us now refer to FIGS. 19 to 23*c* which show a third form of embodiment of the bond still in accordance with the principle of the invention. In this implementation, shown merely by way of example, there is provided a metal part (C3) which is not a joining key but an insert which becomes useful when the tooth is removed after it has become worn. In this implementation, the keying function is provided by the special-purpose material itself which remains in contact with adapter (A3) and tooth (D3) for that part of the special-purpose material which, in a thin thickness, is located between the metal insert and the walls of the openings made in the tooth (D3). The benefit of the metal insert (C3) is apparent when it is necessary to remove the tooth after it has become worn. It is knocked out using a hammer. It then frees the major part of the space represented by the two openings in the tooth (D3). The small quantity of residual special-purpose material that remains in the openings does not provide retention capable of preventing removal of the tooth even without the action of heat. Moreover, it should be noted that insert (C3) fulfils a reinforcement function for the special-purpose material throughout the life of the keying thus obtained. In FIG. 19A, insert (C3.1) has, in its middle part, a waisted section (C3.1*a*) with an intermediate oblong opening (C3.1*b*) allowing passage of the filler material. In FIG. 19B, the insert (C3.2) has, in its middle part, one or more grooves (C3.2*a*).

Tooth (D3) has, on its upper and lower surfaces, openings for passage of the insert, there being provided, as shown in the drawings, an insert retention plate (P) acting as a plug until the bonding material is filled into space (V3) in question. This retention plate is temporarily secured by any appropriate means. The insert is positioned with clearance in the openings in question. Adapter (A3) has an opening in its thickness to allow passage of the insert with clearance. The inserts can be internally hollow and have, at their ends, if applicable, cut bevel profiles forming cutting edges that can be useful when the insert is removed when teeth are changed.

Figure 20A:
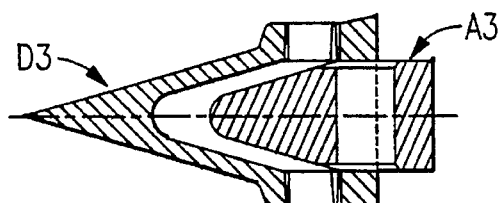
FIGS. 20A, 20B, 20C show the fitting of the various means according to the invention in FIG. 19 with use of an insert according to FIG. 19.
Figure 20B:
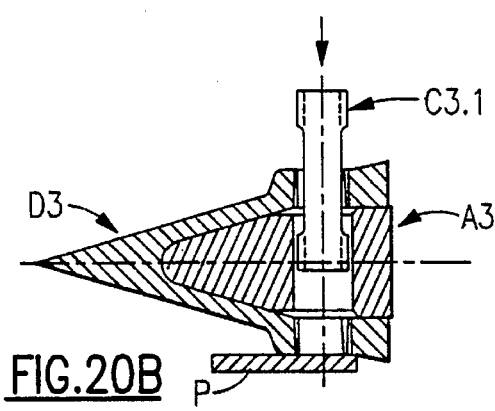
Figure 20C:
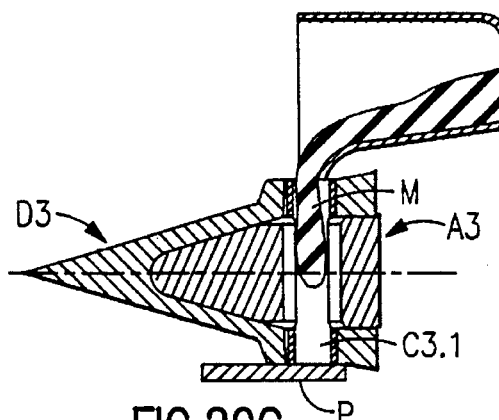

In this implementation, mounting of the assembly is as follows. The adapter is slightly tilted with respect to the horizontal as shown in FIG. 20A in order to allow the tooth to engage, the latter coming into contact with the adapter due to the effect of gravity. The insert is inserted and its base is secured by a separately mounted metal plate (P) in the lower opening in order to retain the insert and block the opening. Space (V3) is then filled by the appropriate material. This space (V3) is defined by sub-spaces (V3.*a*) which correspond to the internal passage cavity of the insert (V3.*b*) between the insert and the openings opposite the adapter and the tooth. The material fills the entire above-mentioned space. The plate is removed after the material has solidified.

Figure 23A:
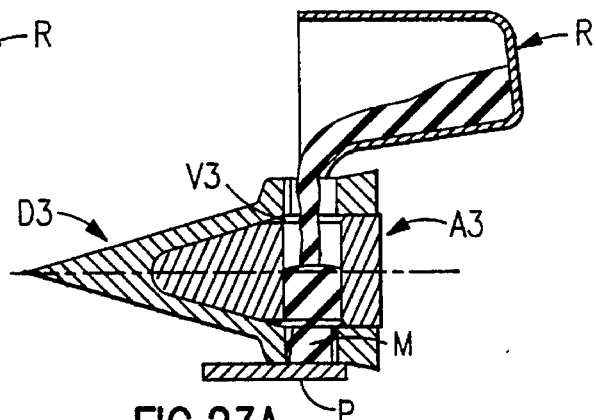
Figure 21:
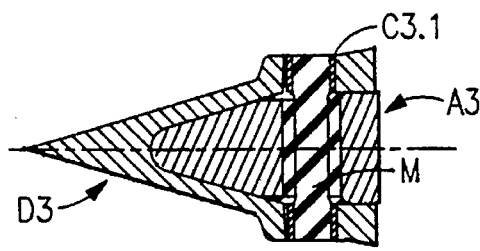
FIG. 21 is a view showing the assembly obtained according to FIGS. 20A, 20B, 20C.
Figure 23B:
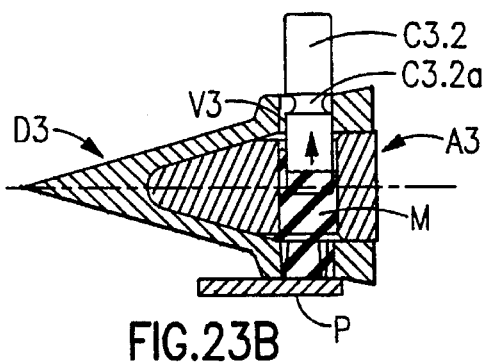
Figure 22:
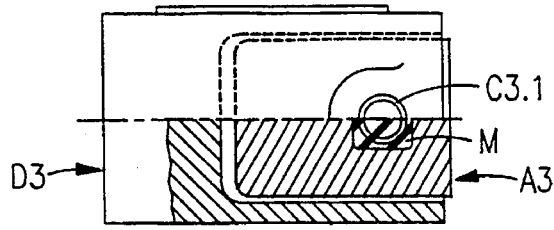
FIG. 22 is a partial sectional top view according to FIG. 21, FIGS. 23A, 23B, 23C show the fitting of the various means according to the invention in FIG. 19 with use of an insert according to FIG. 19B.
Figure 23B:
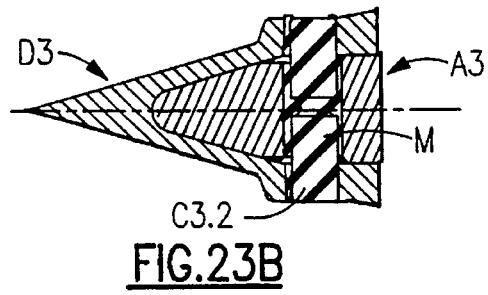
Figure 24:
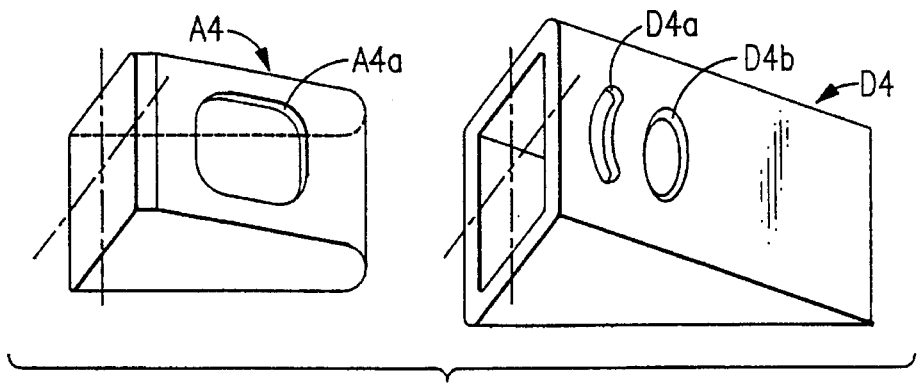
FIG. 24 shows, in a fourth alternative embodiment, the design of the tooth and adapter in a perspective view.
Figure 25:
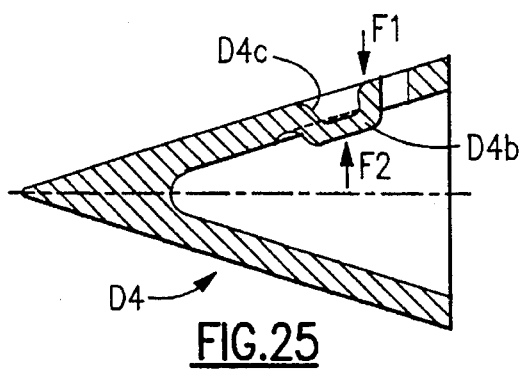
FIG. 25 is a sectional view of the profile of the tooth according to FIG. 24.
Figure 26A:
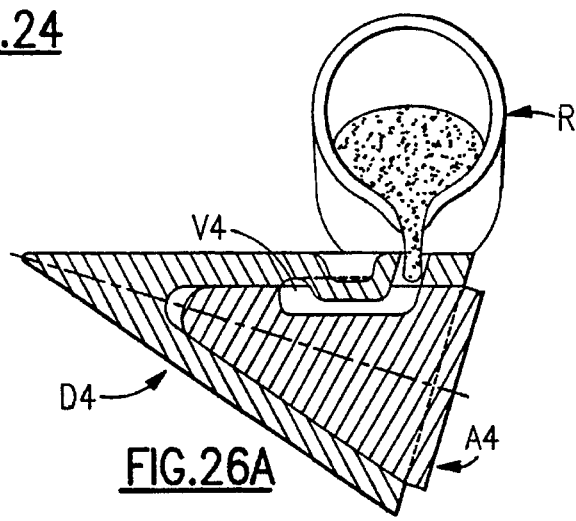
FIGS. 26A, 26B show the fitting of the tooth on the adapter.
Figure 25A:
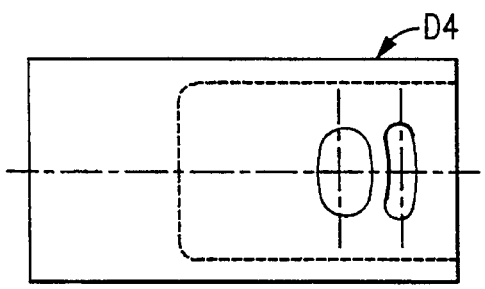
FIG. 25A is an external view of the tooth according to FIG. 25 along arrow F1.
Figure 26B:
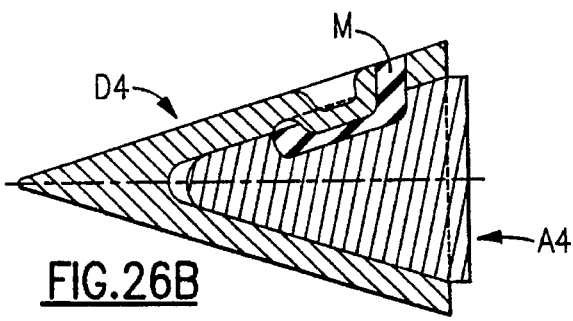
Figure 25B:
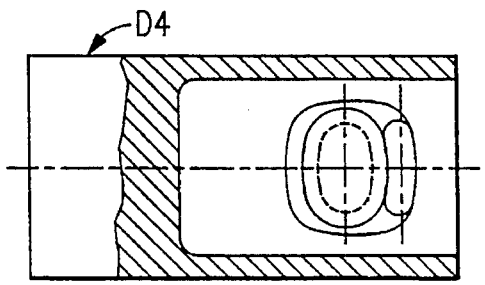
FIG. 25B is an internal view of the tooth according to FIG. 25 along arrow F2.
Figure 26C:
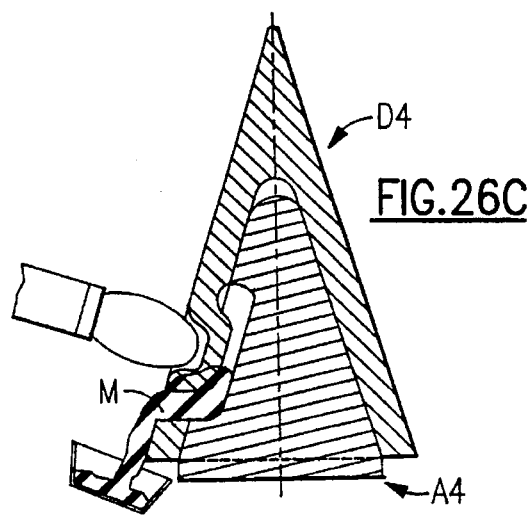
FIG. 26C shows the removal of the tooth from the adapter.

If an insert of the type shown in FIG. 19B is used, the operator inserts the tooth on the adapter (FIG. 23A). The operator previously positions the retention plate in the lower part of the joint with a view to blocking off the lower opening in the tooth. The operator fills the material into space (V3) in question to obtain partial filling. The operator then places and inserts the insert (C3.2) in its recess (FIG. 23B) until the lower part of the insert is immersed and this causes the level of the special-purpose material to rise. With the insert in position, the operator completes, if applicable, filling of the material which seals and fills the entire space in question. The plate is then removed. The tooth is removed using a technique similar to that described above.

A variation in the embodiments shown in FIGS. 24 to 28B is described below.

In this special implementation, no intermediate metal key that joins the tooth and adapter is used and it is only the filler material that bonds the tooth and the adapter which are made with specific shapes. In a first representation (FIGS. 24 to 26C), adapter (A4) has, on its upper surface, a very wide circular or other shaped hollow (A4.a) providing a first area for filling the material. Tooth (D4) has an opening (D4.a) for filling the material intended to be opposite hollow (A4.a). The tooth also has an internal shape forming a projection (D4.b) capable of partially penetrating into the space formed by hollow (A4.a), thus creating a form of spike when the filler material has been poured into above-mentioned space (V4). Said projection (D4.b) forms an imprint and itself has, on its upper surface, a hollow (D4.c) allowing, as shown in the drawings, heating of the material by the conduction of heat so that the material can be changed to a fluid or paste state in order to allow removal of the tooth.

Figure 27:
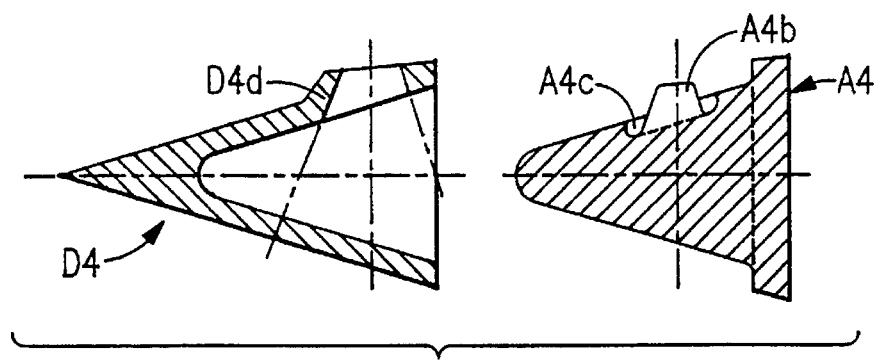
FIG. 27 shows another alternative formation of the tooth and the adapter.
Figure 27A:
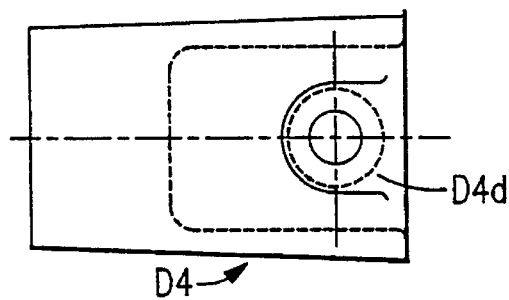
FIGS. 27A and 27B are top views of the tooth and adapter respectively according to FIG. 27, FIGS. 28A and 28B show the fitted assembly according to FIG. 27 and then removal of the tooth from the adapter.
Figure 27B:
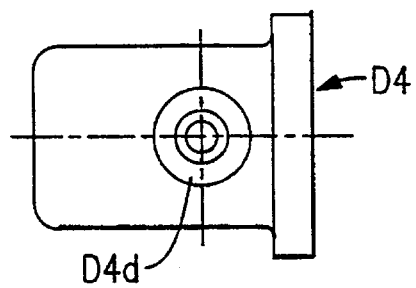
Figure 28A:
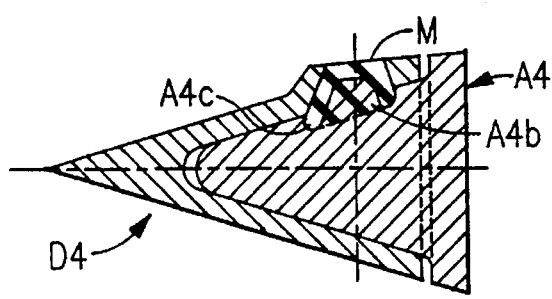
Figure 28B:
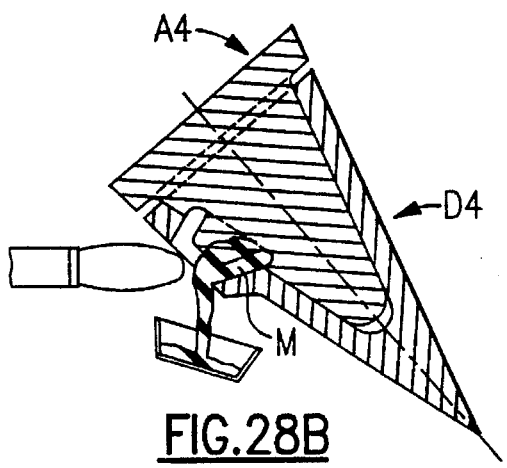
Figure 29A:
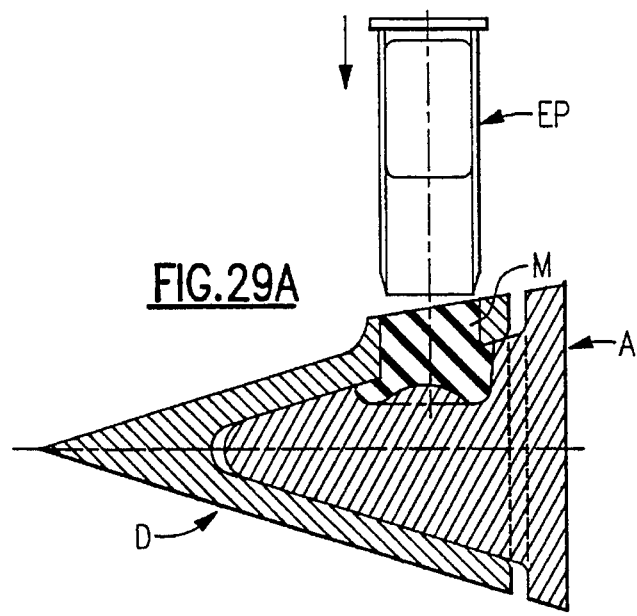
FIGS. 29A and 29B, 29C and 29D show an alternative implementation of the invention with, in particular, a representation of a hollow punch allowing disassembly of the bonding of the tooth on the adapter by removal of the material that produces the bond.
Figure 29B:
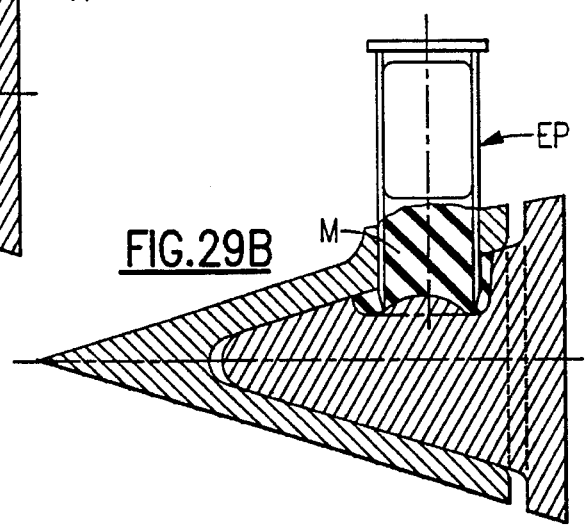
Figure 29C:
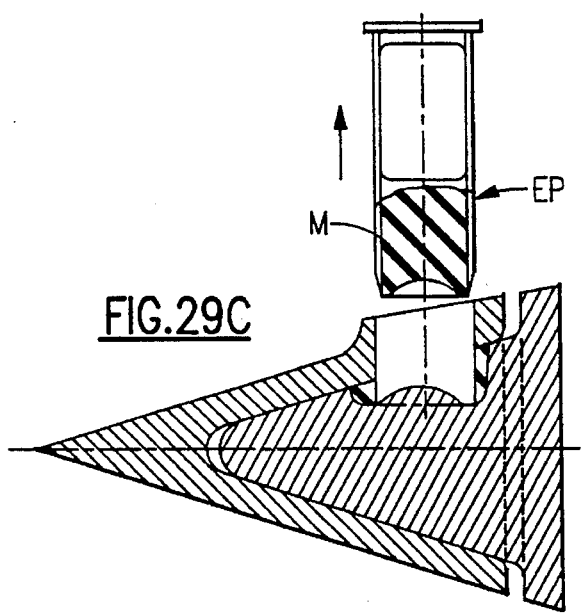
Figure 29D:
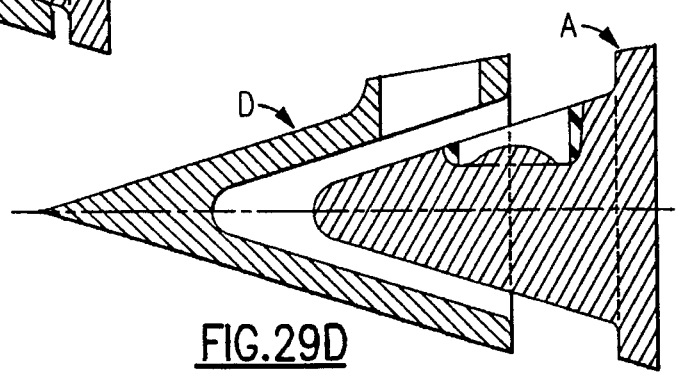

In the second embodiment shown in FIGS. 27 –28B, it is the adapter (A4) that has, on its upper surface, a raised boss (A4.b) that acts as a spike with a circular crown (A4.c) to allow filling of the material. Tooth (D4) has, on its upper part, an elevated area forming a cap (D4.d) easily capable of covering the above-mentioned boss with clearance and leaving a space for filling the bonding material. The upper part of said cap is open to allow the filler material to be poured in. The tooth is removed by simply heating the material and then, in the fluid or paste state, taking the tooth off of the adapter.

FIGS. 29A, 29B, 29C and 29D show another alternative embodiment illustrating the bond between tooth (D) and adapter (A) without a key. As shown in the drawings, the opening for filling the material is positioned in a plane above a housing formed on the adapter, this housing forming a crown of larger size than the opening with a central boss to retain the material. In this implementation, a hollow punch tool (EP) is used which is capable of cutting the solidified material and makes it possible to separate the tooth from the adapter leaving a limited amount of material in the recess that can be scraped away later.

Figure 30:
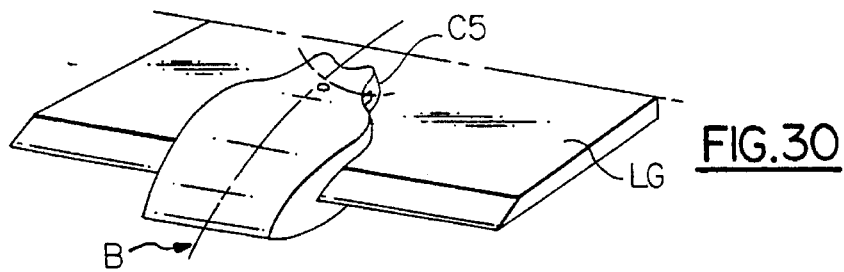
FIG. 30 is a perspective view of an application of the invention by adapting a shield on a bucket blade widely used in the technical field of the invention.
Figure 31:
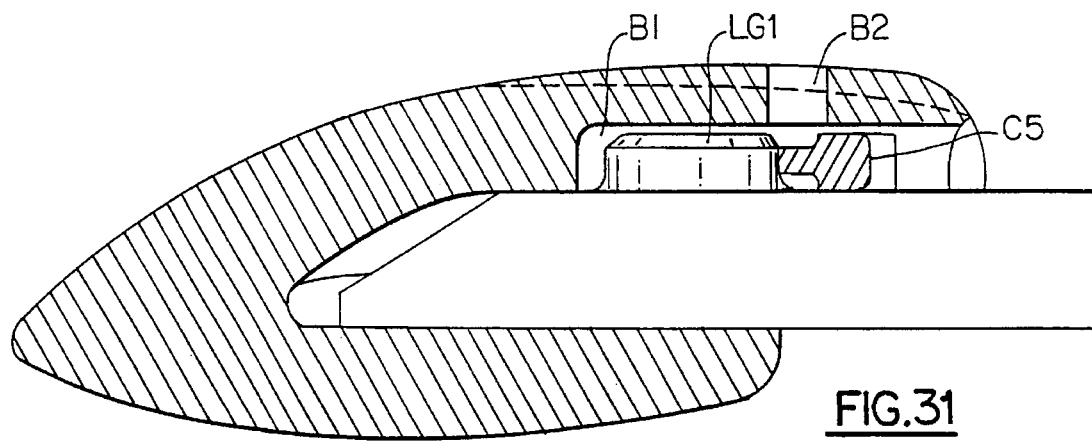
FIG. 31 is a sectional view according to FIG. 30 showing the assembly and the bonding of the shield on the bucket blade with application of the device in the invention.
Figure 32:
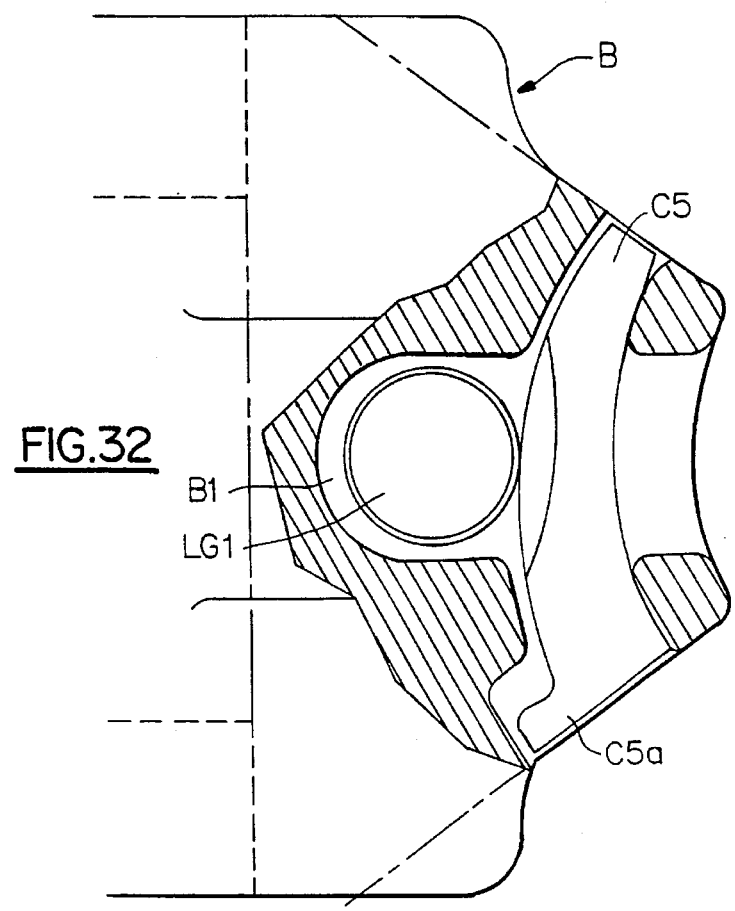
FIG. 32 is a sectional top view according to FIG. 31 showing, in particular, the specific shapes of the joining key between the shield and the bucket lip.
Figure 33:
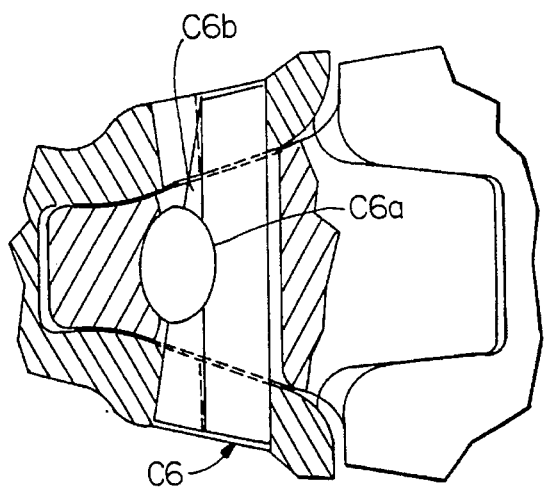
FIG. 33 is an alternative view of another implementation of mounting the tooth on the adapter showing a key with a special profile (FIG. 33A)
Figure 34:
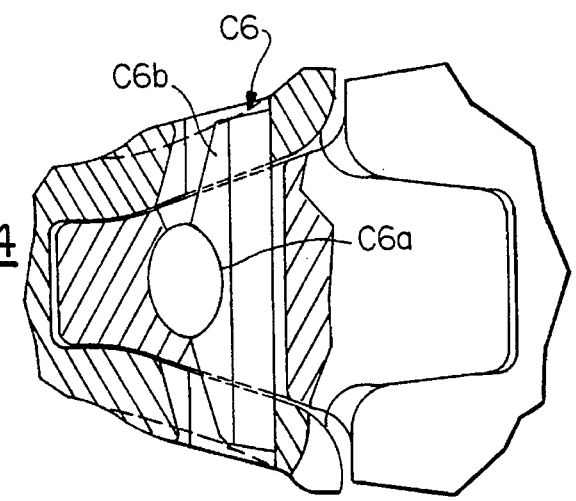
FIG. 34 is another variation according to FIG. 33, FIGS. 35A, 35B and 35C represent various key shapes to fit the variation in FIG. 34.
Figure 35A:
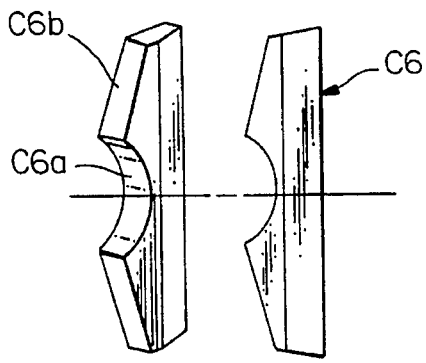
Figure 33A:
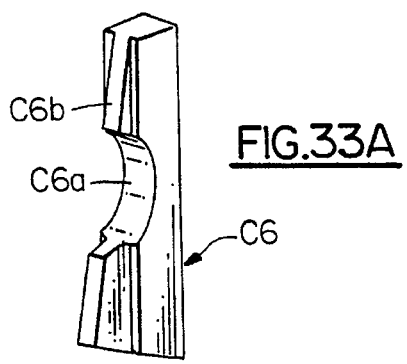
Figure 35B:
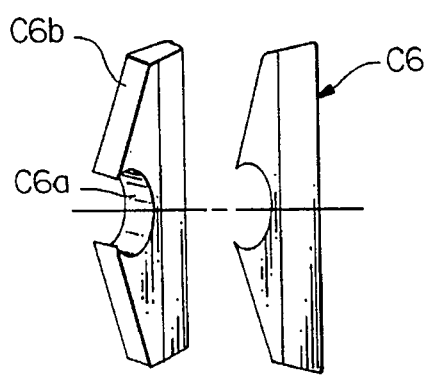
Figure 35C:
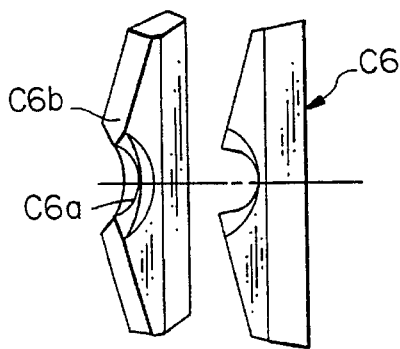
Figure 36:
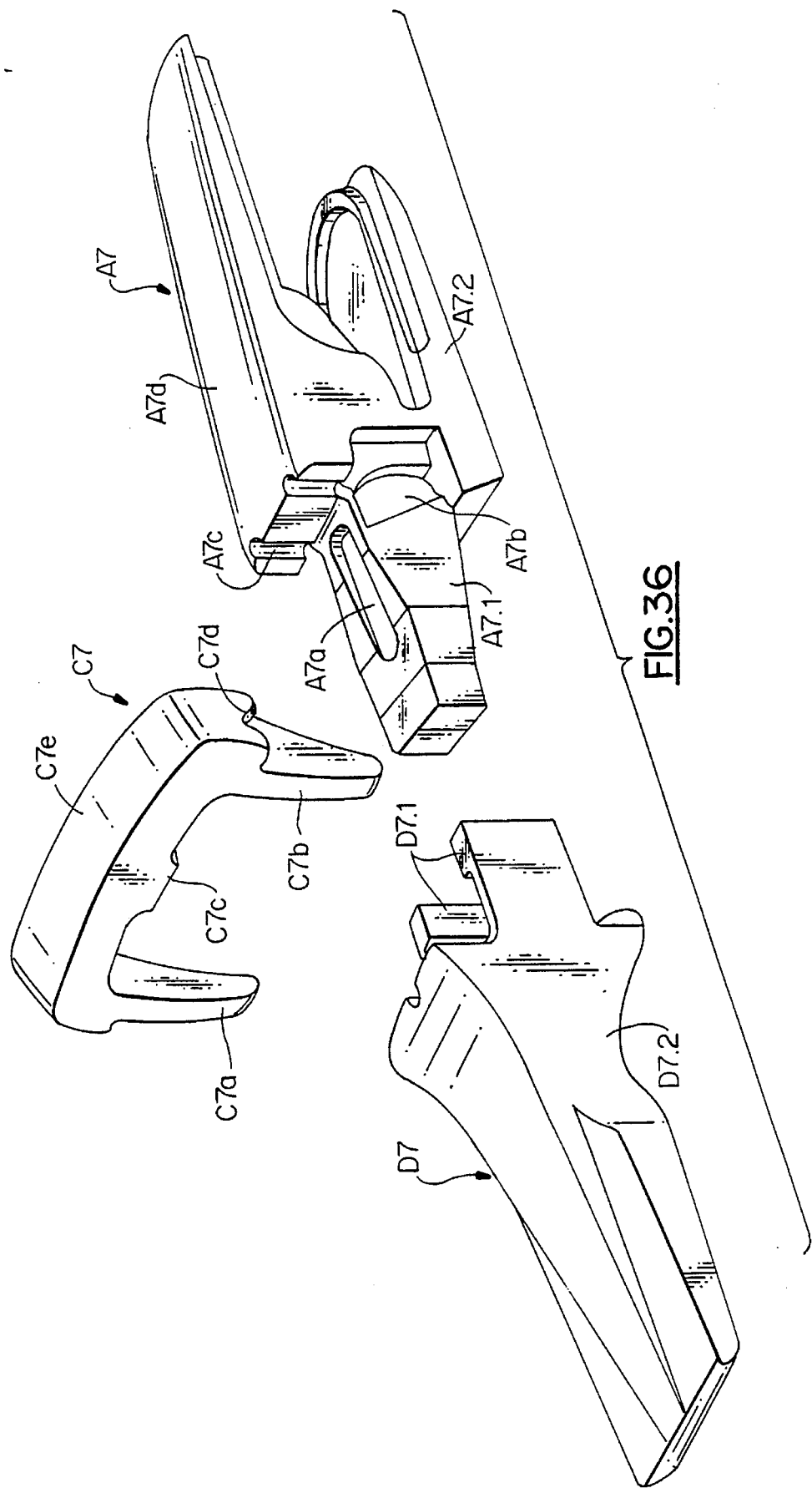
FIG. 36 is a perspective view before assembly of another alternative application of the invention if the bond between the adapter and the tooth requires the use of a U-shaped key to fulfil the keying function and the function of protecting the back of the adapter as well as use of the filler material according to the invention.
Figure 37:
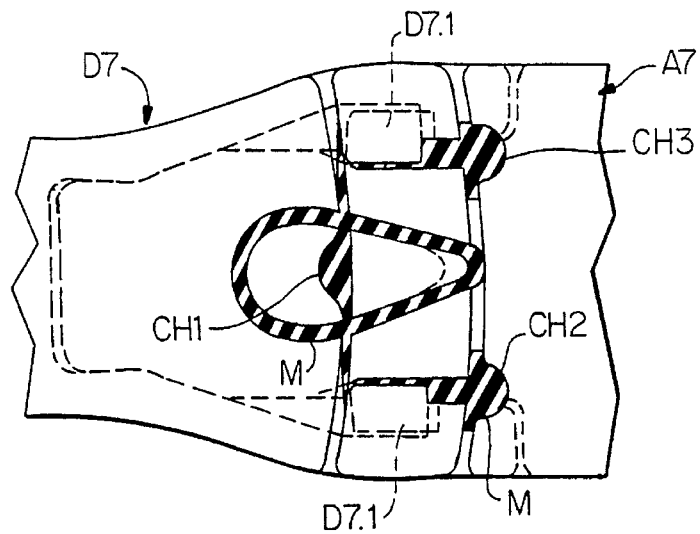
FIG. 37 is a top view according to FIG. 36.
Figure 38:
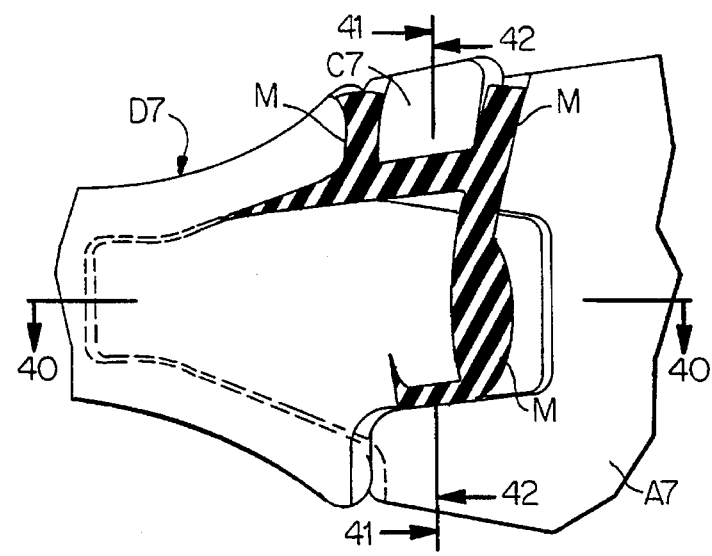
FIG. 38 is an external side view according to FIG. 36.
Figure 39:
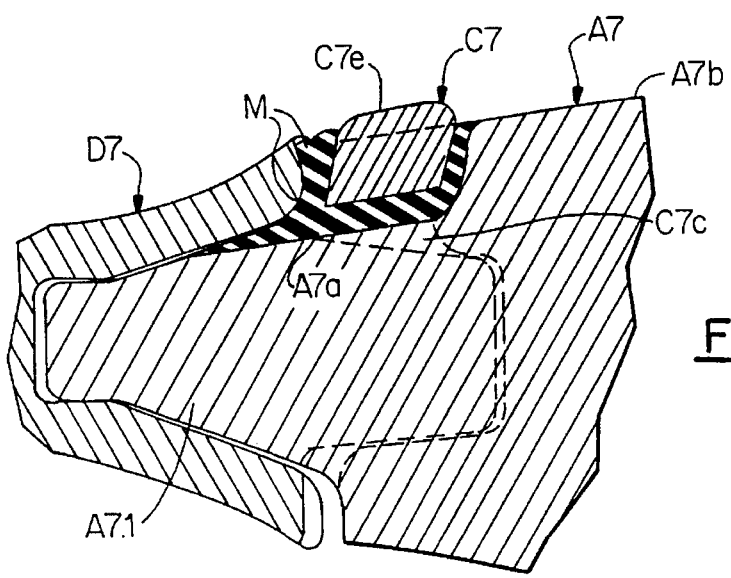
FIG. 39 is a sectional view along lane 39 in FIG. 40.
Figure 40:
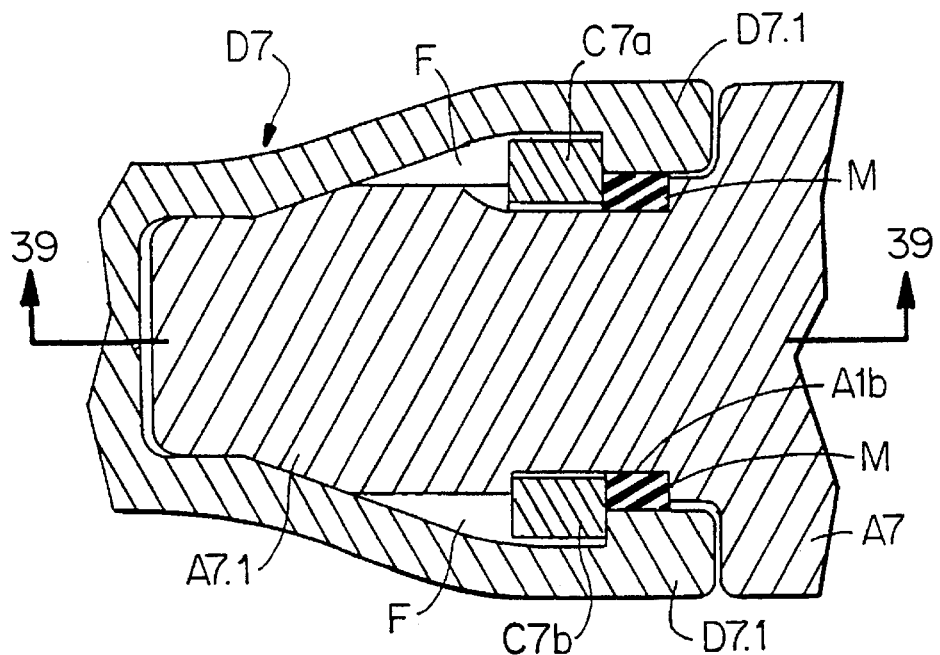
FIG. 40 is a sectional view along line 40 in FIG. 38.
Figure 41:
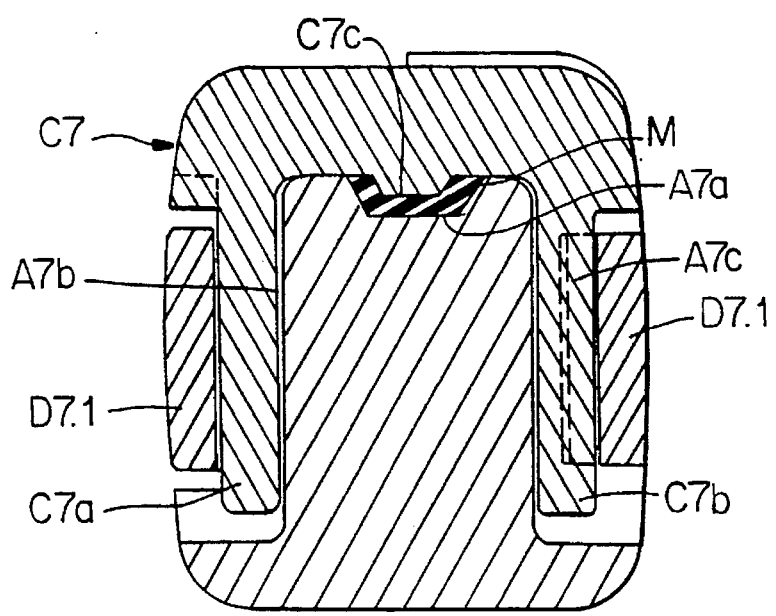
FIG. 41 is a view showing two opposite half sections along lines 41 and 42 in FIG. 38.

In FIGS. 30 to 32, a shield (B) is bonded to a bucket lip (LG). The latter has, on its upper surface, a circular bearing surface (LG1) that can be inserted into an internal cavity (B1) of large size and volume formed on the upper part of the shield, this cavity oommunicating with an opening (B2) which allows filling of the filler material. The above-mentioned cavity is shaped to allow the insertion of a through key (C5) advantageously of circular shape with a tapered cross section, this key having a heel (C5a) that fits in a hollow formed in the cavity. The filler material will bond the shield to the lip of the bucket with the intermediate key in the formed cavities. This key is removed by simply striking its thinner end, the material then being shattered to allow removal of the key.

Let us now refer to FIGS. 33, 33A, 34 35A, 35B and 35C which show the insertion of a shaped key between the tooth and the adapter in predefined cavities allowing filling of the special-purpose material. These keys (C6) may have, in their middle part, a circular groove (C6a) with end parts (C6b) forming a bevel to slice the filler material when the keys are removed.

FIGS. 36 to 41 show another implementation of the invention in which the keys are linked to a protective component of the adapter to form a multi-purpose monolithic assembly. The bond between tooth (D7) and adapter (AT) is made by means of key (C7) forming a U-shaped piece, the assembly being designed to allow filling and containment of the bonding material through three filler openings made in the same plane and allowing the formation of anchoring areas between the tooth and the adapter in different planes.

In this configuration, tooth (D7) has two lateral lugs (D7.1) of essentially rectangular profile that are thicker than the part for bonding (D7.2) with the body of the tooth. Adapter (A7) has a profiled tip (A7.1) capable of engaging and fitting, with clearance, in the body of the tooth, the tip of this adapter having a much smaller cross-section than the body (A7.2) of the adapter and laterally defining spaces for inserting and embedding the lugs of the tooth.

According to the invention, the adapter tip has, in its thickness, three hollowed areas forming recesses (A7a, A7b, A7c), one being in an upper plane and the two others in vertical lateral planes either side of the adapter tip. These recesses are made with a specific volume and the lateral recesses are therefore opposite the lug parts and the areas where the tooth is bonded with the tip. In this way one defines, after placing the tooth on the adapter body, three cavities, one in an upper horizontal plane or essentially horizontal and the others in vertical lateral planes. The spaces (F) thus formed allow a quick and easy insertion fit of the U-shaped key (C7) that has two arms (C7a, C7b) that freely penetrate into the lateral cavities in addition, the U-shaped key has, between its two arms and on its lower surface, a boss or projection (C7c) that penetrates into the upper recess (A7a) formed on the adapter tip. The arms of the U-shaped key advantageously have a curved profile and rest behind the lugs formed on the tooth in order to retain it.

Essentially three shafts (CH1-CH2-CH3) or openings are formed on the basis of the upper part of the tooth and of the body of the adapter, these shafts opening out in the cavities forming recesses for filling and containing the filler material. The end parts of the arms of the key do not pass through the body of the adapter. The filler material spreads in the fluid state throughout all the cavities formed, thus producing a solid bond in all the joint planes thus obtained.

Advantageously, the U-shaped key is designed at the point where its arms are formed with a hollow (C7d) making it possible to insert a tool in order to release the key.

Since the U-shaped key does not open out into the lower part of the adapter, it is thus completely protected against any pressures created by materials capable of tending to expel it. In addition, the upper part (C7e) of the key forming a small bridge matches the profile of the back (A7d) of the adapter that is thus protected and is located, after positioning, in a continuation plane between the corresponding profiles and opposite the tooth and the adapter. The pressures exerted by materials on this upper surface of the U-shaped key can only contribute to securing it in place.

The locking of the elastic material prevents any direct linear movement of extraction which can only take place by deliberate circular movement due to the profile of the key. This makes it possible to use only a retention force limited by the presence of the material on the concave curve of the keys, thus making their removal easy.

without going outside the scope of the invention, the matching peak and valley shapes on the tooth and adapter may vary depending on requirements and applications.

The advantages of the invention are evident. Regardless of the embodiment, the assembly of the tooth on the adapter requires no absolutely accurate geometrical positioning. After the tooth comes into contact with the adapter due to the effects of gravity or by holding it manually, either the key or an insert is inserted followed by the filler material or the filler material itself fills the spaces (Vl- V2- V3-V4) thus defined. Assembly is extremely simple and avoids any constraints encountered subsequently. In addition, the proposed solution makes it possible to obtain much larger areas of absolute contact and bonding between the tooth and adapter in question, allowing better retention on all levels and in the areas desired. The forces exerted on the tooth can be absorbed by the greater surface areas in complete contact with their support and this makes it possible to significantly reduce the thicknesses of walls of tooth housings which are therefore lighter for a given frontal area subject to wear.

Another aspect is the fact that in order to remove the keys, deliberate action is required, either striking the latter or heating the filler material during a sustained operation until the key is completely extracted, conditions that pressures exerted by external materials (rock, stone, etc.) cannot satisfy. The force needed for deliberate removal can be controlled by the configuration of the shapes of the keys.

Thus, according to the invention, the special-purpose material has a triple function:

It secures the tooth on its adapter without the use of a key or insert,

If a key or insert is used, it acts as a tightening key in order to secure the tooth on the adapter and holds the key or insert in its operating position, In every case, it makes it possible to achieve absolute contact between tooth and adapter in the form of contact cushions by filling any clearance between the respective surfaces of the tooth and those of the adapter as well as recesses deliberately provided to contain it. These recesses may be made on any surfaces of the fit or on all of them if desired.

The invention aims at a device and process for bonding that retains its full value and remains applicable regardless of the shapes adopted for the adapter tip and the cavity in the corresponding tooth regardless whether or not a key or an insert is used and, if so, regardless of the position adopted for the key or insert.

What is claimed is:

1. Device for bonding removable teeth and adapters on the ends of tools and receptacles used on an excavator, said tooth having a hollow internal shape, openings into said hollow internal shape and a contact surface, said adapter having a tip, shape allowing it to fit into said tooth and a contact surface, an elastic filler material acting as packing being placed in at least one area between the tooth and adapter in order to provide at least one contact cushion to ensure distribution of stresses and strains, characterized in that the tooth and adapter are made with at least one pair of matching shapes to constitute areas for filling, accommodating, containing and removing said elastic filler material applied after prior assembly of the tooth on the adapter in order to provide, at least in the contact area, absolute contact between the tooth and adapter thus allowing the latter to withstand the stresses and strains over larger surface areas, the elastic filler material being capable of deformation and in that the matching shapes are located near and in connection with the openings for filling the elastic filler material and in that the elastic filler material, as it solidifies, performs the functions of bonding and securing the tooth and the adapter and in that the configuration of the areas intended for filling and containing the elastic filler material have the function of fixing at least one mass of elastic filler material of a volume sufficient to be capable of compression and expansion during transmission to the adapter of multidirectional mechanical stresses exerted on the tooth during its operation, the tooth and adapter are made with matching cavities located in relation to the areas for receiving the elastic filler material, said matching cavities allowing positioning of a shaped key mounted on the tooth that goes through the adapter and filling by the elastic filler material which then acts as a tightening key and also secures the key by filling the bonding and containing areas between the tooth and the adapter.

2. Device as claimed in claim 1 characterized in that the matching shapes containing the elastic filler material are arranged in the areas between the tooth and adapter to ensure sealed containment of the elastic filler material.

3. Device as claimed in claim 2 characterized in that said key (C3) between the tooth (D3) and adapter (A3) is constructed with openings in said key such that said openings can be filled by the elastic filler material.

4. Device as claimed in claim 3 characterized in that the key (C3.1) has a middle part with a waisted section (C3.1$a$) with an intermediate opening (C3.1$b$) allowing passage of the elastic filler material and in that a retention plate (P) is temporarily fitted on a lower surface of the tooth to ensure initial positioning of the key and to act as a plug when the cavity that receives the elastic filler material (M) is filled.

5. Device as claimed in claim 3 characterized in that the key (C3.2) has a middle part with at least one groove (C3.2$a$) allowing passage of the elastic filler material and in that a retention plate (P) is temporarily fitted on a lower surface of the tooth to ensure initial positioning of the key and to act as a plug when the cavity that receives the elastic filler material (M) is filled.

6. Device as claimed in claim 1 wherein said key (C) is positioned connected to the tooth but with clearance relative to the adapter, said elastic filler material acting as a tightening key and securing it during service.

7. Device as claimed in claim 1 characterized in that the elastic filler material is a product that is liquid at room temperature and which solidifies by polymerization.

8. Device as claimed in claim 1 characterized in that the elastic filler material is a paste product hardened by polymerization.

9. Device as claimed in claim 1 characterized in that the elastic filler material is a product in powder form.

10. Device as claimed in claim 1 characterized in that the tooth (D1) has a lower surface and the tooth and adapter (A1) are designed to allow essentially vertical engagement of said key (C1), said adapter having an upper surface, an internal part and a tip, said key having a top and a tapered end part (C1.$a$) capable of fitting in a beveled opening (D1.$g$) in the lower surface of said tooth, said key having above its tapered end, a hollow (C1.$b$) that opens out into the top of the key opposite an opening (A1.$a$) made on the upper surface of the adapter and an opening (D1.$d$) made on the upper surface of the tooth and the upper surface (A1.$c$) of the adapter tip has a hollow (A1.$d$) around the opening (A1.$a$) on the upper surface of the adapter in order to define, after joining of the assembly, a space (VI) capable of containing the elastic filler material.

11. Device as claimed in claim 10 characterized in that the space (V1) is defined on the one hand by a space (V1.*a*) formed in the tip and, on the other hand, by a space (V1.*d*) formed in the internal part of the adapter opposite the hollow (C1.*b*) on the key.

12. Device as claimed in claim 1 characterized in that the device comprises said key, having a rear end (C2), being positioned horizontally which ensures bonding between the tooth (D2) and adapter (A2), said tooth having lateral surfaces (D2.*a*) with two oblong openings (D2.*b*) (D2.*c*) which allow fitting of the key, one of said two oblong openings (D2.*c*) having a conical shape with a slope to ensure securing and seating of the key of which the rear end (C2.*a*) has a taper corresponding to said conical shaped opening, said tooth having a top surface and an opening (D2.*e*) to allow pouring of the elastic filler material and the adapter (A2) has an upper part with a large crosswise groove (A2.*a*) to allow free passage of the key (C2) and to define a filling space or chamber (V2) for the elastic filler material.

13. Device as claimed in claim 12 characterized in that the key (C2) has a middle part with a semi-circular hollow (C2.*b*) placed at right angles to the filler opening formed on the tooth, said hollow contributing to bonding of the tooth and adapter.

14. Device as claimed in claim 1 characterized in that the tooth and adapter have at least one pair of matching valley and peak shapes defining an internal space with access openings to allow filling of the elastic filler material (M).

15. Device as claimed in claim 1 characterized in that the key has a middle part with a circular groove to slice the filler material when the key is removed.

16. Device as claimed in claim 1 characterized in that the bond between the tooth (D7) and adapter (A7) is made by means of said key (C7) forming a U-shaped piece, the tooth and adapter being designed to allow filling and containment of the elastic filler material through three filler openings made in a first plane and allowing the formation of anchoring areas between the tooth and adapter in a second plane.

17. Device as claimed in claim 16 characterized in that the tooth(D7) has an upper part and two lateral lugs (D7.1), the adapter having a profiled tip (A7.1) of smaller cross-section than the body (A7.2) of the adapter, said tip having, in its thickness, hollowed areas forming recesses (A7*a*, A7*b*, A7*c*), one being in an upper essentially horizontal plane and the others in vertical lateral planes on either side of the tip, the lateral recesses being located opposite the areas where the tooth is bonded thus defining cavities (F) allowing fitting of the U-shaped key (C7) and in that shafts (CH1, CH2, CH3) are formed on the upper part of the tooth and the body of the adapter, these shafts opening out in the cavities (F) and allowing filling and containment of the elastic filler material, and in that the U-shaped key has a boss (C7*c*) that penetrates into the upper recess (A7*a*) formed on the adapter tip.

18. Device as claimed in claim 17 characterized in that the adapter has a back and the U-shaped key has an upper part (C7*e*) shaped to the back of the adapter in a continuation plane with the corresponding upper shapes of the tooth and adapter and the U-shaped key has a hollow (C7*d*) constructed such that a tool can be inserted into the hollow in order to release the key.

* * * * *